United States Patent
Rommer et al.

(10) Patent No.: US 10,616,764 B2
(45) Date of Patent: Apr. 7, 2020

(54) METHODS AND DEVICES FOR SELECTING NETWORK PARTITION IN UNTRUSTED WLAN ACCESS

(71) Applicant: TELEFONAKTIEBOLAGET LM ERICSSON (PUBL), Stockholm (SE)

(72) Inventors: Stefan Rommer, Västra Frölunda (SE); Henrik Basilier, Täby (SE); Torbjörn Cagenius, Sollentuna (SE); Gunnar Mildh, Sollentuna (SE); Gunnar Nilsson, Lidingö (SE); Lennart Norell, Hägersten (SE); Göran Rune, Linköping (SE); Ann-Christine Sander, Göteborg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 49 days.

(21) Appl. No.: 15/564,217

(22) PCT Filed: Apr. 8, 2016

(86) PCT No.: PCT/EP2016/057767
§ 371 (c)(1),
(2) Date: Oct. 4, 2017

(87) PCT Pub. No.: WO2016/162487
PCT Pub. Date: Oct. 13, 2016

(65) Prior Publication Data
US 2018/0132101 A1 May 10, 2018

Related U.S. Application Data

(60) Provisional application No. 62/144,748, filed on Apr. 8, 2015.

(51) Int. Cl.
*H04W 12/06* (2009.01)
*H04L 29/12* (2006.01)
(Continued)

(52) U.S. Cl.
CPC ......... *H04W 12/06* (2013.01); *H04L 61/3075* (2013.01); *H04W 12/08* (2013.01);
(Continued)

(58) Field of Classification Search
CPC .................................................. H04L 61/3075
(Continued)

(56) References Cited

U.S. PATENT DOCUMENTS 9,712,541 B1 * 7/2017 Harris ................... H04L 63/105
2004/0039798 A1 * 2/2004 Hotz ................. H04L 29/12066
709/219

(Continued)

OTHER PUBLICATIONS

Labib, "Enhancing the Robustness of LTE Systems: Analysis and Evolution of the Cell Selection Process", Feb. 2017, IEEE, pp. 208-215 (Year: 2017).*

(Continued)

*Primary Examiner* — Alexander Lagor
*Assistant Examiner* — Gregory A Lane
(74) *Attorney, Agent, or Firm* — Rothwell, Figg, Ernst & Manbeck, P.C.

(57) ABSTRACT

A method implemented in a user equipment (UE) includes connecting to a WLAN access point. The method further includes constructing a domain name for a packet system network, the domain name including network partition information for the packet system network. The method further includes transmitting, to a DNS server via the WLAN access point, the constructed domain name. The method further includes receiving, from the server, at least one address corresponding to a network node associated with the network partition information.

23 Claims, 12 Drawing Sheets

(51) Int. Cl.
*H04W 48/12* (2009.01)
*H04W 12/08* (2009.01)
*H04W 48/16* (2009.01)
*H04W 48/20* (2009.01)

(52) U.S. Cl.
CPC ........... *H04W 48/12* (2013.01); *H04W 48/16* (2013.01); *H04W 48/20* (2013.01)

(58) Field of Classification Search
USPC .............................................. 726/4; 370/331
See application file for complete search history.

(56) References Cited

U.S. PATENT DOCUMENTS

| | | | | |
|---|---|---|---|---|
| 2009/0285126 | A1* | 11/2009 | Lu | H04L 29/12283 370/255 |
| 2011/0216743 | A1* | 9/2011 | Bachmann | H04L 63/164 370/331 |
| 2012/0173051 | A1* | 7/2012 | Tarnutzer | H04L 12/40006 701/2 |
| 2013/0171944 | A1* | 7/2013 | Futaki | H04W 24/10 455/67.11 |
| 2013/0317668 | A1* | 11/2013 | Tarnutzer | H04L 12/40006 701/2 |
| 2014/0153559 | A1 | 6/2014 | Roeland | |

OTHER PUBLICATIONS

International Search Report and Written Opinion issued in application No. PCT/EP2016/057767 dated Aug. 5, 2016, 13 pages.
El Hattachi, Rachid et al.: "5H White Paper", Feb. 17, 2015, XP055242573, retrieved from the Internet: URL: https://www.ngm.org/fileadmin/ngmn/content/download/Technical/2015/NGMN_5G_White_Paper_V1_0.pdf, 125 pages.
"Network Functions Virtualization and Software Management", Dec. 1, 2014, XP055260149, retrieved from the Internet: URL:http://www.ericsson.com/res/docs/whitepapers/network-functions-virtualization-and-software-management.pdf, 9 pages.

* cited by examiner

US 10,616,764 B2

METHODS AND DEVICES FOR SELECTING NETWORK PARTITION IN UNTRUSTED WLAN ACCESS

CROSS REFERENCE TO RELATED APPLICATION(S)

This application is a 35 U.S.C. § 371 National Stage of International Patent Application No. PCT/EP2016/057767, filed Apr. 8, 2016, designating the United States and claiming priority to U.S. provisional application No. 62/144,748, filed on Apr. 8, 2015. The above identified applications are incorporated by reference.

TECHNICAL FIELD

This disclosure relates generally to selecting a network partition and, more particularly, to methods and devices for a UE selecting a network partition in untrusted WLAN access.

BACKGROUND

Existing networks (2G, 3G, 4G, WLAN, etc., and evolution thereof) and future Radio Access and Core Networks (5G, 6G, etc.) require solutions for supporting optimized network functionality for addressing new use cases for cellular technologies.

Evolved Packet System (EPS) is the Evolved 3GPP Packet Switched Domain and consists of Evolved Packet Core (EPC) and Evolved Universal Terrestrial Radio Access Network (E-UTRAN). EPS also supports packet switched access over GSM/EDGE Radio Access (GERA), Universal Terrestrial Radio Access (UTRA) and Wireless Local Area Network (WLAN).

FIG. 1 illustrates an example EPC architecture for 3GPP accesses (GERAN, UTRAN and E-UTRAN), which includes, for example, a PGW (PDN Gateway), SGW (Serving Gateway), PCRF (Policy and Charging Rules Function), MME (Mobility Management Entity), HSS (Home Subscriber Service) and user equipment (UE). The LTE radio access, E-UTRAN, consists of one more eNBs. FIG. 1 illustrates the architecture for 3GPP accesses. In these types of accesses, the radio interface is specified by 3GPP (e.g., E-UTRAN).

FIG. 2 illustrates an example E-UTRAN architecture. The E-UTRAN consists of eNBs, providing the E-UTRA user plane (PDCP/RLC/MAC/PHY) and control plane (RRC) protocol terminations towards the UE. The eNBs are interconnected with each other by means of the X2 interface. The eNBs are also connected by means of the S1 interface to the EPC (Evolved Packet Core), more specifically to the MME (Mobility Management Entity) by means of the S1-MME interface and to the Serving Gateway (S-GW) by means of the S1-U interface.

FIG. 3 illustrates an example EPC architecture that also takes into account non-3GPP accesses. In non-3GPP accesses, the radio interface is not specified by 3GPP (e.g., WLAN). A non-3GPP access may be treated as trusted or untrusted. Whether a non-3GPP access should be treated as trusted or untrusted depends on, for example, security considerations and operator policies. In this regard, a trusted access may be managed by an operator (e.g., an operator hotspot) whereas, an untrusted access is not managed by the operator (e.g., a Wi-Fi access point at home). With an untrusted non-3GPP access, a security gateway (ePDG) is used between the non-3GPP domain and the operator's network. The UE sets up a secure tunnel to the ePDG, where there is a S2b interface between ePDG and PGW. A trusted 3GPP access hosts a gateway in the non-3GPP domain. For WLAN, the gateway is denoted Trusted WLAN Gateway (TWAG), where there is a S2a interface between TWAG and PGW.

Future networks are expected to support new use cases going beyond the basic support for voice services and mobile broadband (MBB) currently supported by existing cellular networks (e.g., 2G/3G/4G). An example new use case includes evolution of MBB including evolved communication services, cloud services, and extended mobility and coverage. Another example new use case includes mission critical machine type communication including intelligent traffic systems, smart grid, and industrial applications. Another example new use case includes massive machine type communication including sensors/actuators and capillary networks. Another example new use case includes media including efficient on-demand media delivery, media awareness, and efficient support for broadcast services.

These use cases are expected to have different performance requirements (e.g., bit-rates, latencies, mobility, availability, etc.) as well as other network requirements affecting the network architecture and protocols. Supporting these new use cases may require that new players and business relations are needed compared to existing cellular technologies. For example, it is expected that future networks should address the needs of enterprise services, governments services (e.g., national safety), verticals industries (e.g., industry automation, transportation), and residential users. These different users and services are also expected to place new requirements on the network.

Accordingly, it is expected that new services with a wide range of heterogeneous requirements need to be supported. There is a need to be able to support these new services in a cost efficient way using common network infrastructure (e.g., radio, transport, networking, processing, and storage) and functional components (e.g., mobility manager) applied to specific business segments (e.g., verticals with specific requirements), while still making it possible to optimize the network when it comes to deployment, functionality needed, scalability, etc. for these new services. Additionally, it is desired by one of ordinary skill in the art to provide isolation between the different business segments of the common network infrastructure to prevent one user associated with one or more services from causing problems to other users and services.

In some 3GPP solutions, an operator may deploy one (or more) dedicated core networks (DECOR) (also referred to as "network partitions" or "slices") within a PLMN with each core network dedicated for a specific type(s) of subscriber or device. The DECOR solution enables an SGSN or MME initially handling a UE to redirect a UE to a specific dedicated core network (e.g., a different SGSN or MME) based on subscription information and operator configuration, without requiring the UEs to be modified. A limitation of this 3GPP solution is that it only works when the UE connects via a 3GPP access, and no support is available in case the UE connects via WLAN integrated to EPC using S2a/S2b interfaces.

One scenario of particular interest today is untrusted WLAN access. That scenario is today being deployed by several operators to support WiFi calling, i.e., IMS voice services of WLAN access.

A particular problem not addressed by the existing solutions for network partitioning is how to perform network partition selection in an untrusted WLAN access. One particular problem in this case is that there are no solutions for how to direct the UE to an ePDG in the correct network partition. According to current ePDG selection mechanisms, the UE uses a Domain Name Server (DNS) to locate an ePDG in either the visited PLMN (in case of a roaming UE) or in the home PLMN (in case of roaming or non-roaming UE). The ePDG FQDN is defined as:

ePDG FQDN="epdg.epc.mnc<MNC>.mcc<MCC>.pub.3gppnetwork.org" where,

MNC is the Mobile Network Code

MCC is the Mobile Country Code

MNC and MCC together define the PLMN.

However, there is no mechanism to direct a UE to a particular network partition within a PLMN.

Separate PLMN IDs could be used, but that has several drawbacks, including the need to provide different SIM cards depending on network partition.

SUMMARY

In one aspect of the invention, a method implemented in a user equipment (UE) includes connecting to a WLAN access point. The method further includes constructing a domain name for a packet system network, the domain name including network partition information for the packet system network. The method further includes transmitting, to a server via the WLAN access point, the constructed domain name. The method further includes receiving, from the server, at least one address corresponding to a network node associated with the network partition information.

In some embodiments, the packet system network includes an Evolved Packet System (EPS) and the WLAN access point is associated with an untrusted non-3GPP access.

In some embodiments, the partition information includes an identifier of a partition of the packet system network, the partition including one or more network nodes or functions. In some embodiments, the network partition information is pre-configured in the UE. In some embodiments, the method further includes receiving, from the packet system network, the network partition information in an over-the-air message.

In some embodiments, the constructed domain name is a fully qualified domain name (FQDN), and the at least one address is an IP address to an evolved Packet Data Gateway (ePDG) in a partition of the packet system network.

In some embodiments, the method further includes sending an authentication request to the ePDG and setting up an IP Security (IPsec) tunnel with the ePDG. In some embodiments, the authentication request comprises the network partition information. In some embodiments, the server is a domain name server (DNS).

In another aspect of the invention, a method implemented in a network partition includes receiving, from a user equipment (UE), an authentication request. The method further includes verifying the UE's access of the network partition. In some embodiments, the verifying is based on UE subscription data. In some embodiments, the authentication request includes a network partition information and the method further includes selecting a Packet Data Network (PDN) Gateway (PGW) based on the network partition information.

According to some embodiments, a user equipment (UE), includes a processor and a non-transitory computer readable medium coupled to the processor, where the non-transitory computer readable medium contains instructions executable by the processor. The UE is operative to connect to a WLAN access point. The UE is further operative to construct a domain name for a packet system network, the domain name including network partition information for the packet system network. The UE is further operative to transmit, to a server via the WLAN access point, the constructed domain name. The UE is further operative to receive, from the server, at least one address corresponding to a network node associated with the network partition information.

According to some embodiments, a node in a network partition, includes one or more processors and a non-transitory computer readable medium coupled to the one or more processors, where the non-transitory computer readable medium contains instructions executable by the one or more processors. The node is operative to receive, from a user equipment (UE), an authentication request. The node is further operative to verify the UE's access of the network partition.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

The embodiments disclosed herein introduce a solution where the UE does the partition, or slice, selection as part of the discovery and selection of the network node that the UE contacts for EPC access. For untrusted WLAN access, this means that the UE selects an ePDG located in the appropriate network partitions.

This selection is done by having the UE extend (or decorate) the ePDG FQDN with partition information, e.g., a partition identity. When the UE performs DNS resolution of such ePDG FQDN, the ePDG IP address(es) corresponding to ePDG entities in the desired network partition are returned to the UE. In some embodiments, the partition information may comprise device type, use-case type, or other information that can be used to differentiate between partitions.

The advantages of the solution is that it makes it possible to support use-case or service-specific optimizations and architecture or protocol enhancements, while still supporting existing users by the existing network functions. This allows for a smooth introduction of new features in the system.

The advantages of taking partition information into account when performing ePDG selection include:

The UE is able to select and connect to an ePDG in the correct network partition.

There is no impact to network entities except the DNS system. There is no need to impact the ePDG.

The UE is directly connecting to the desired partition, or slice, without going through a re-direct or re-attach procedure.

One aspect of this embodiment is that a partition identifier is used by the UE to select a target network node when connecting to the packet core network. In particular, a solution is that ePDG selection for untrusted non-3GPP access is extended to include a Partition Identifier in the ePDG FQDN. The Domain Name System (DNS) can be configured to provide the ePDG IP addresses of ePDG(s) located in the network partition corresponding to the ePDG FQDN extended with Partition Information.

Figure 1:
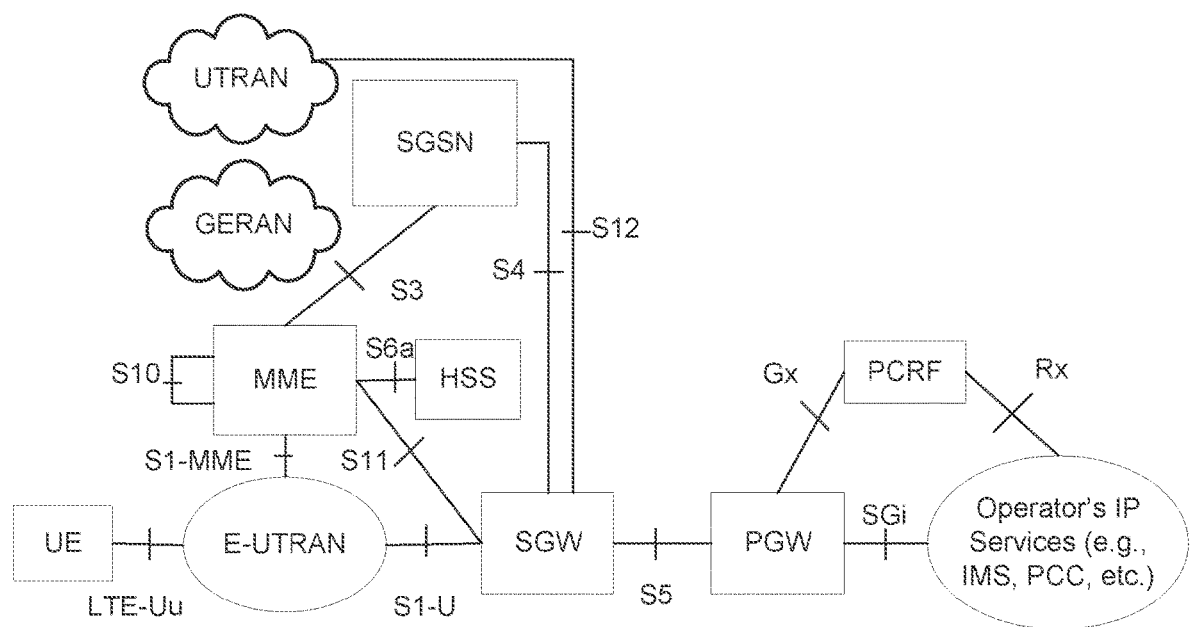
FIG. 1 is an illustration of non-roaming EPC architecture for 3GPP access.
Figure 2:
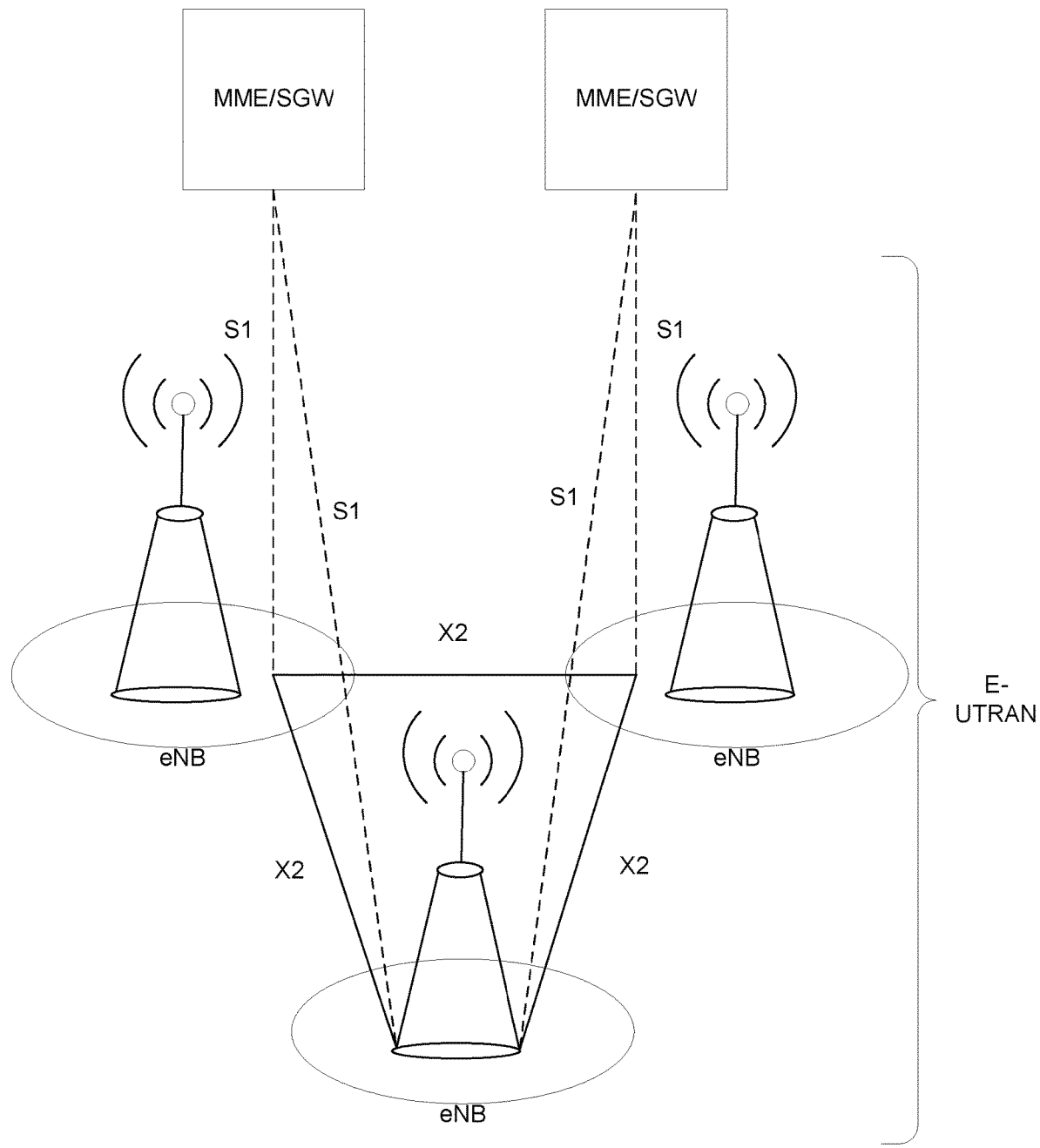
FIG. 2 is an illustration of E-UTRAN architecture.
Figure 3:
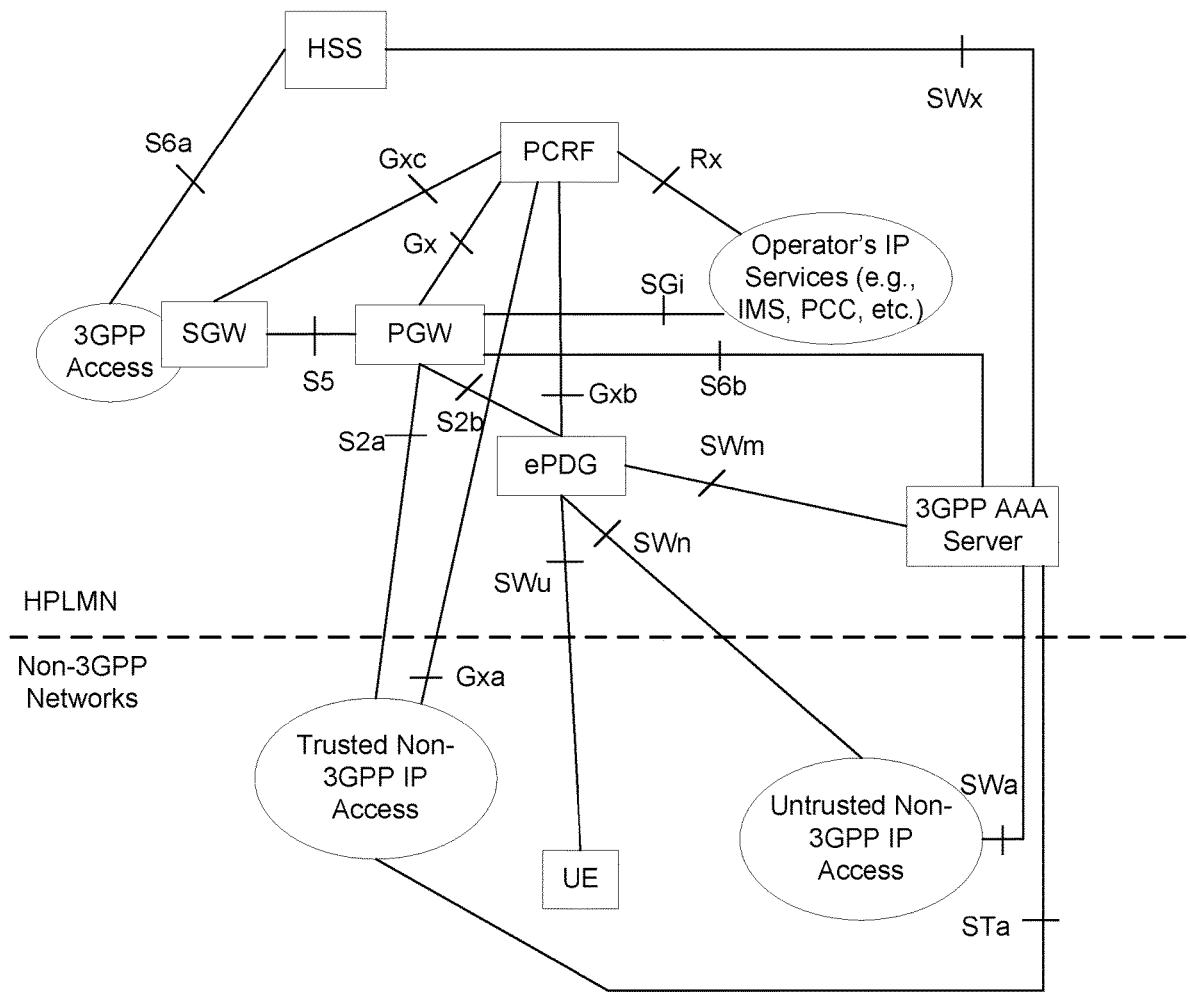
FIG. 3 is an illustration of non-roaming EPC architecture for 3GPP and non-3GPP access.
Figure 4:
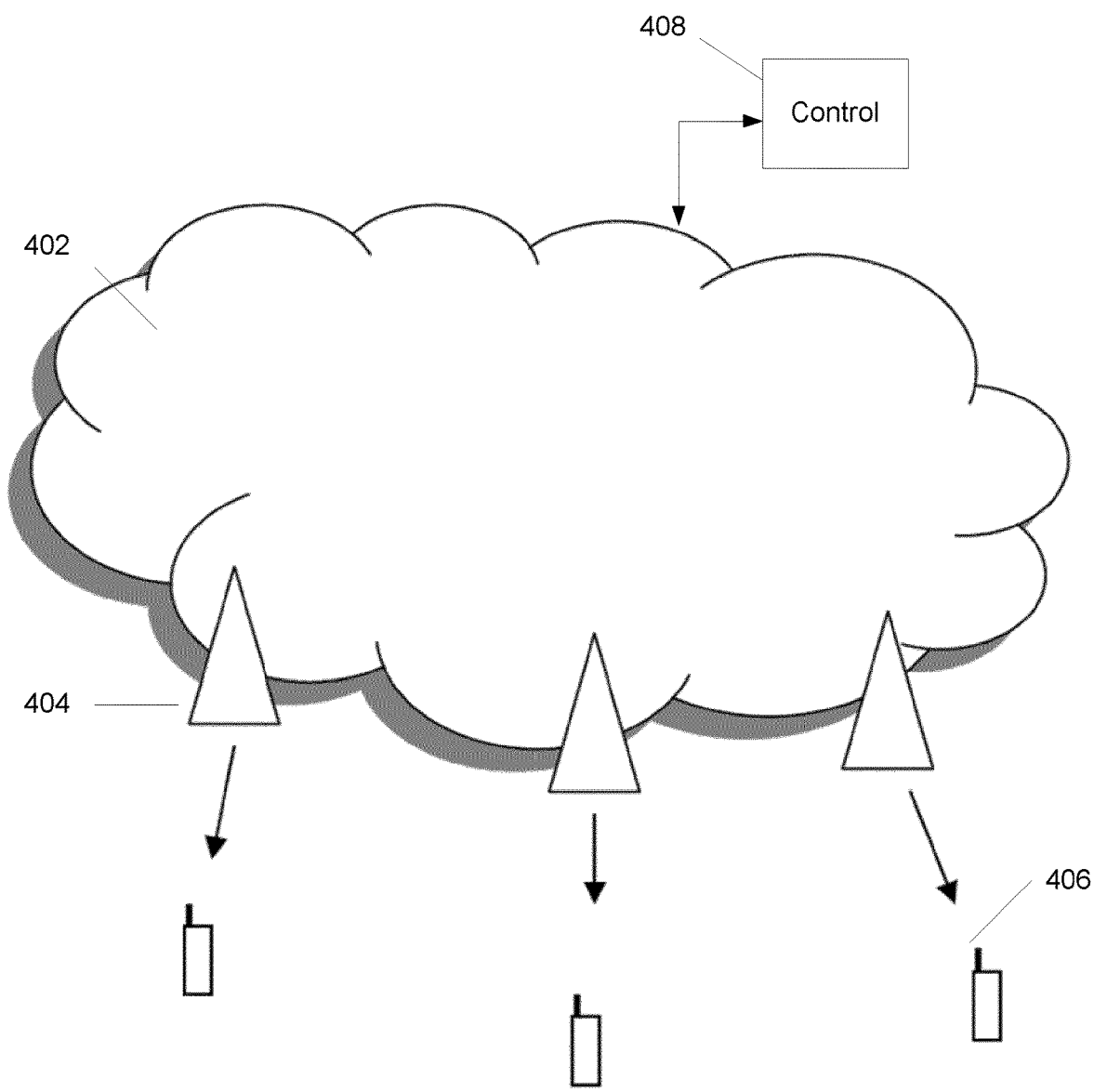
FIG. 4 illustrates user equipments connected to a wireless communication system in accordance with exemplary embodiments.

FIG. 4 illustrates user equipments (UEs) 406 connected to a wireless communication system 400 in accordance with exemplary embodiments. FIG. 4 shows UEs connected to a network 402 via access points 404. A control node 408, such as, e.g., an eNB or RNC, communicates with the UEs through the network 402.

Figure 5:
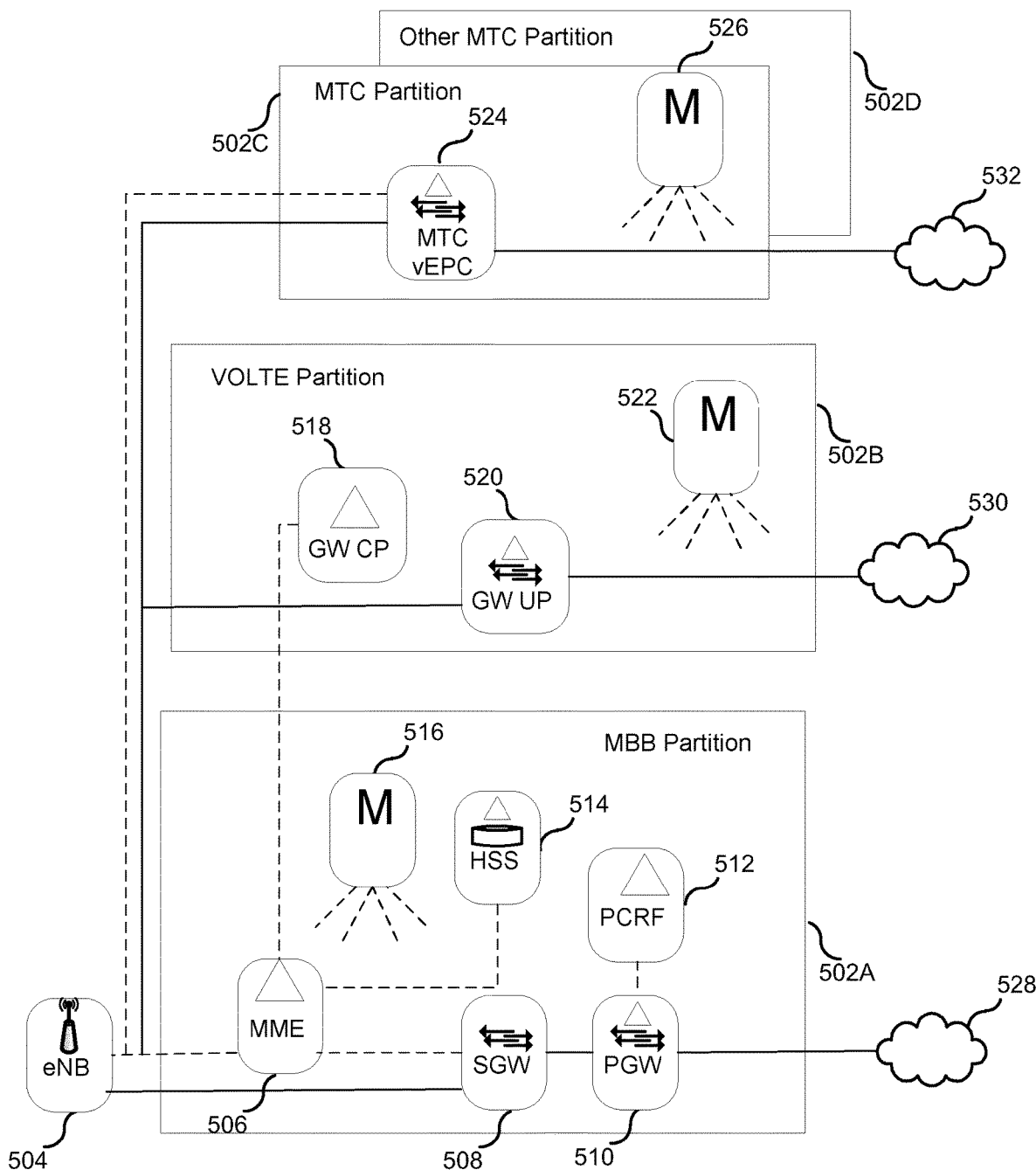
FIG. 5 is an illustration of an exemplary partition structure for a wireless communication system in accordance with exemplary embodiments.

FIG. 5 illustrates an embodiment of network partitioning, where the EPC is dived into several different partitions, also called slices, where different network partitions support different services and handle different users. The actual functional components of the different network partitions may be supported on the same infrastructure (e.g., when using Network Functional Virtualization NFV) or the components can use different hardware.

FIG. 5 illustrates an example EPC network with an MBB partition (502A) connected to cloud 528, a Voice over LTE (VoLTE) partition (502B) connected to cloud 530, a first Machine-Type (MTC) partition (502C), and a second MTC partition (502D) each connected to cloud 532. As illustrated in FIG. 5, each of the partitions are in communication with an eNB 504. The MBB partition 502(a) includes, for example, a MME 506, a SGW 508, a PGW 510, a Policy Control Rules Function (PCRF) 512, a Home Subscriber Server (HSS) 514, and an operation support systems (OSS) node 516. The VoLTE partition 502B includes, for example, gateways 518 and 520 and OSS node 524. The first MTC partition 502C includes, for example, an MTC node 522 that facilitates communication between eNB 504 and network 532. The first MTC partition 502C further includes OSS node 526. The second MTC partition 502D may include a similar group of nodes as the first MTC partition 502C.

According to some embodiments, network partitioning may be deployed in several different layers of the network. Partitioning between the RAN and EPC assumes a common RAN and radio interface supporting several different EPC partitions. Other possible places to deploy network partitioning includes between S-GW and PDN GW, or between network layer and service layer (e.g. IMS).

In some embodiments, a common base architecture supports the network partitions of the network. As an example, a common base architecture may include a common RAN architecture and RAN interface (radio, S1 interface, etc.). Furthermore, in some embodiments, the network includes mechanisms for network partition selection including how the UE is assigned to a specific network partition at initial connection.

According to some embodiments, a network partition is a (logical) partition of the network, used e.g. for resource allocation, isolation, operational efficiencies, optimization, business relevance or to improve TTM/TTC. The network partition may include a group of nodes logically associated with the partition.

In some embodiments, a base partition is the first network partition to which the UE connects and is responsible for authenticating the UE towards the network. Different UEs could be associated with different base partitions. In some embodiments, a resource instance is a physical or virtual resource used as a building block for network partitions, which can be dedicated or shared among network partitions.

According to some embodiments, in EPC network partitioning, (i) the interface between the RAN and CN can be common for all network partitions and can be based on the S1 interface between E-UTRAN and EPC; (ii) one base partition can connect to more than one RAN, thus providing RAN mobility functionality inside the base partition; (iii) one RAN can connect to more than one base partition; (iv) the base partition selected for the UE may be verified through subscription data; (v) network partitioning is applicable for any cellular access (2G/3G/4G/5G etc. and for Wi-Fi); (vi) it is not required that a UE must re-attach to a partition upon moving between partitions; and (vii) both virtualized and non-virtualized environments are supported.

According to some embodiments, an identifier of the network partition is used by the UE when selecting which core network node/instance to use for connecting to the packet core network. In particular, for untrusted non-3GPP access, the UE uses an identifier of the network partition when selecting which ePDG to use.

In some embodiments, the ePDG FQDN is extended or modified with a Partition ID and use that extended FQDN when resolving the FQDN in the Domain Name System (DNS). An extended FQDN could, e.g., be defined as:

ePDG FQDN="epdg.epc.<PARTITION_ID>.mnc<MNC>.mcc<MCC>.pub.3gppnetwork.org"

where,

<PARTITION_ID> is information identifying a network partition.

The PARTITION_ID could, e.g., be a partition type such as "MBB" for a network partition supporting mobile broadband services or "V2X_MTC" for a network partition supporting critical machine type communication for vehicular services. The partition could also be more specific and, e.g., contain information about a specific customer or tenant of a network partition. The PARTITION_ID could, e.g., be "ABC_Energy" for a network partition serving massive machine type communication with the ABC Energy Company's sensors and meters. In addition, the PARTITION_ID could be any type of numerical or alphanumerical string or value possible to resolve in DNS.

Figure 6:
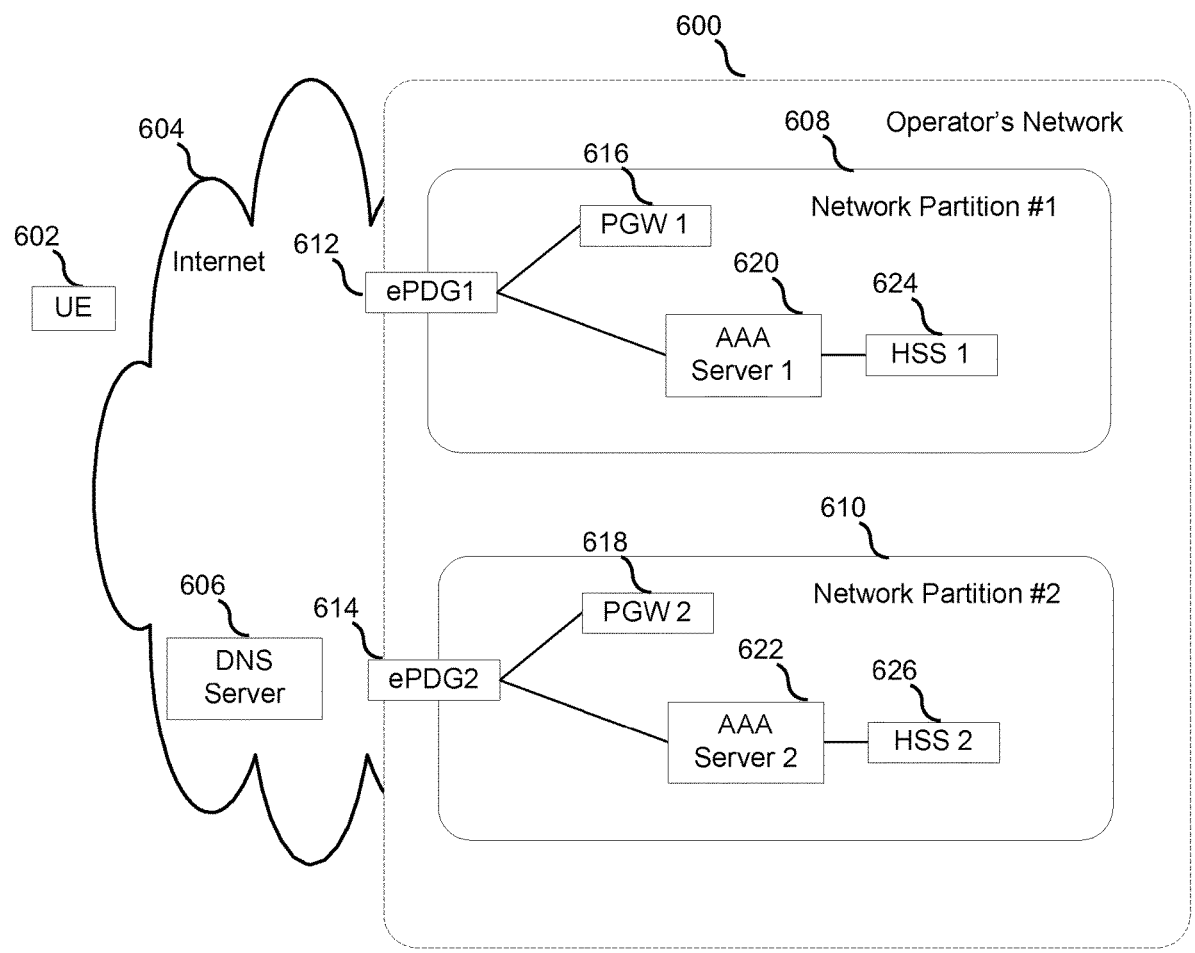
FIG. 6 is an illustration of an exemplary wireless communication system in accordance with exemplary embodiments.

FIG. 6 shows an exemplary wireless communication system in accordance with exemplary embodiments. FIG. 6 shows two network partitions 608 and 610 within a network 600. DNS Server 606 resolves ePDG FQDNs. It should be noted that the figure shows a simplified network architecture with only a subset of the network entities and interfaces. For example, the partitions 608, 610 may include at least one ePDG 612, 614; at least one PGW 616, 618; at least one AAA Server 620, 622; and at least one HSS 624, 626, respectively.

Figure 7:
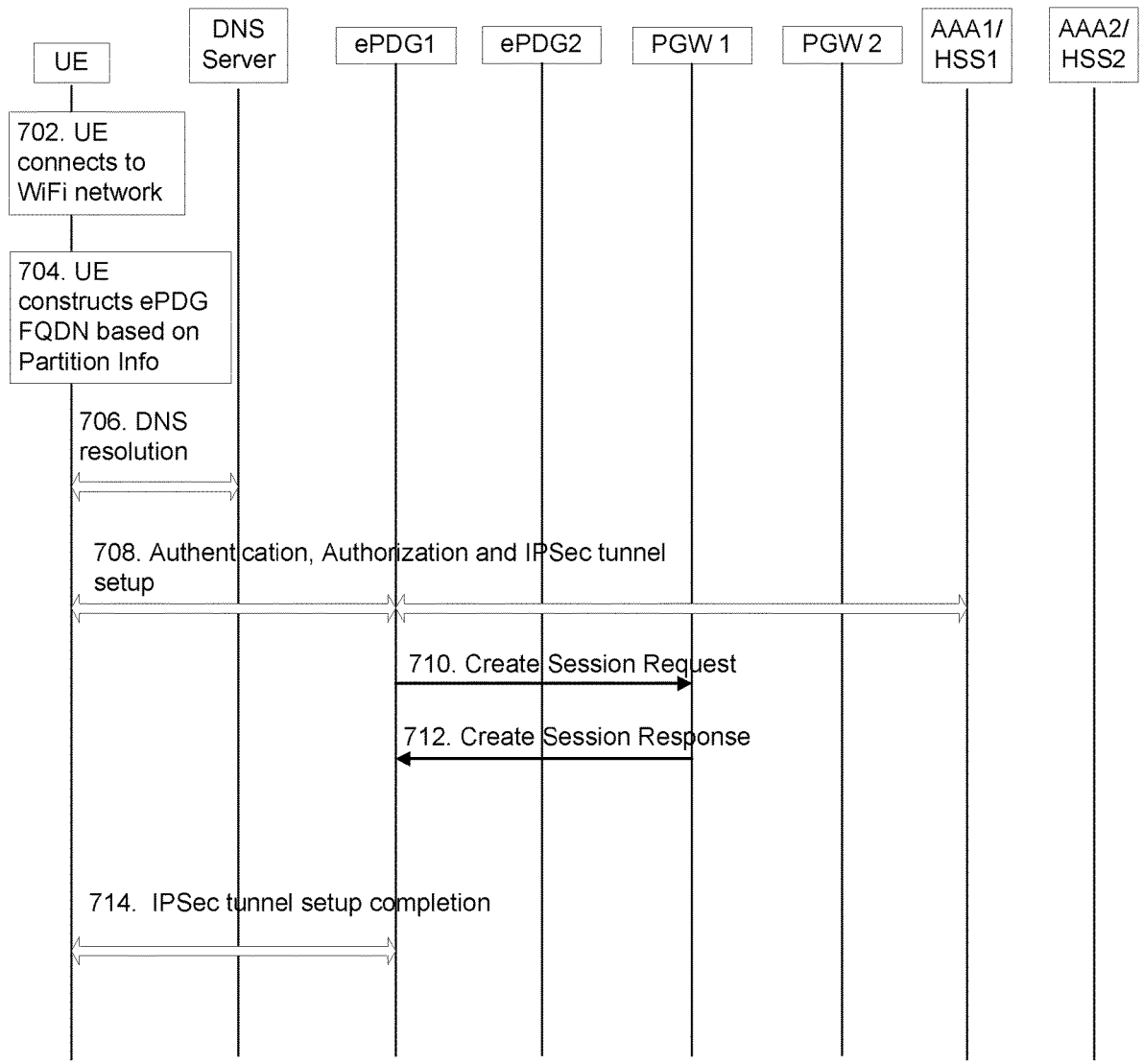
FIG. 7 is an illustration of an exemplary sequence diagram.

FIG. 7 is an illustration of an exemplary sequence diagram.

Step 702. The UE 602 connects to a WLAN network which, e.g., can access the Internet 604, and retrieves and configures a local IP address.

Step 704. The UE constructs an ePDG FQDN taking into account, e.g., the Partition Information. In this example sequence diagram, the Partition Information identifies the network partition #1 containing ePDG1. The ePDG FQDN could, e.g., be constructed as:

ePDG FQDN="epdg.epc.partition1.mnc123.mcc456.pub.3gppnetwork.org"

Step 706. The UE resolves the ePDG FQDN in the Domain Name System and receives one or more IP addresses corresponding to ePDGs in the desired network partition (network partition #1 in this case).

Step 708. The UE and ePDG contact the AAA/HSS servers to perform Authentication and Authorization and to begin the setup of the IPSec tunnel.

Step 710. The ePDG sends a Create Session Request message to the PGW.

Step 712. The PGW responds to the ePDG with a Create Session Response message.

Step 714. An IPSec tunnel is established between the UE and ePDG.

In some embodiments, steps 708-714 may be performed per normal procedures for untrusted non-3GPP IP access, as defined in TS 23.402.

In one embodiment, the UE may include the Partition Information as part of the authentication and authorization in step 708. The ePDG may then use the information, e.g., for selecting a suitable PGW.

Figure 8:
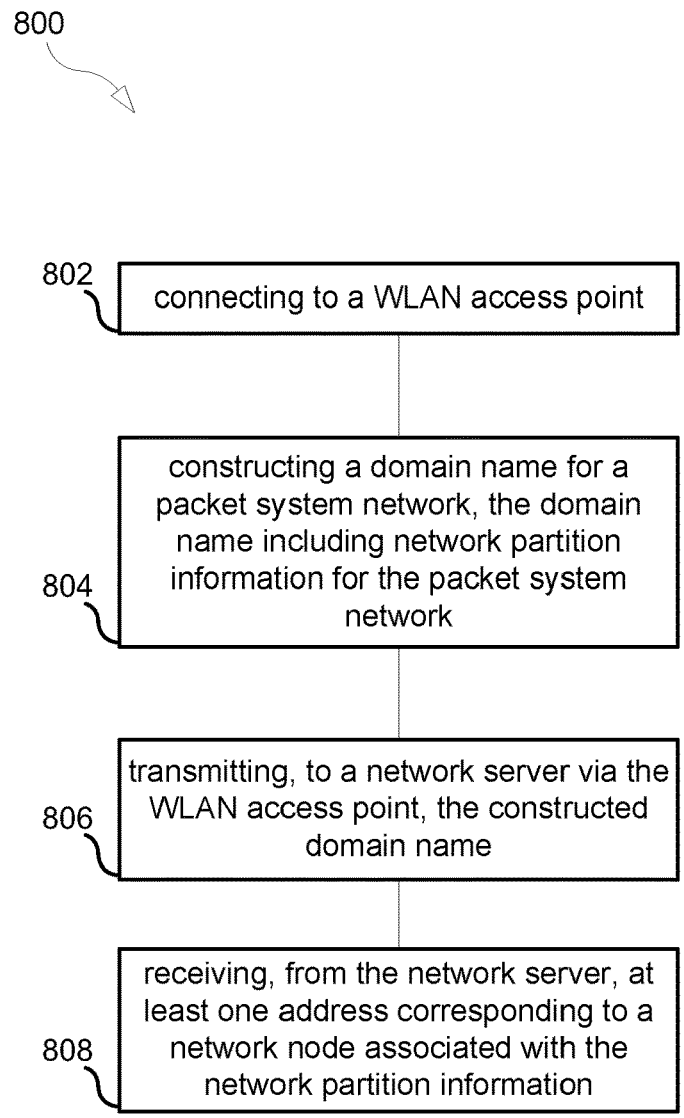
FIGS. 8-9 are illustrations of exemplary flow diagrams.

FIG. 8 illustrates a method 800, implemented in a UE. The method includes connecting to a WLAN access point (step 802). In some embodiments, the WLAN access point is associated with an untrusted non-3GPP access.

The method further includes constructing a domain name for a packet system network, the domain name including network partition information for the packet system network (step 804). In some embodiments, the packet system network includes an Evolved Packet System (EPS). In some embodiments, the network partition information includes an identifier of a partition of the packet system network, the partition including one or more network nodes or functions. In some embodiments, the network partition information is pre-configured in the UE. In other embodiments, the method further includes receiving, from the packet system network, the network partition information in an over-the-air message. In some embodiments, the constructed domain name is a fully qualified domain name (FQDN). In some embodiments, the at least one address is an IP address to an evolved Packet Data Gateway (ePDG) in a partition of the packet system network.

The method further includes transmitting, to a server via the WLAN access point, the constructed domain name (step 806).

The method further includes receiving, from the server, at least one address corresponding to a network node associated with the network partition information (step 808).

In some embodiments, the method further includes sending an authentication request to the ePDG and setting up an IP Security (IPSec) tunnel with the ePDG. In some embodiments, the authentication request comprises the network partition information.

Figure 9:
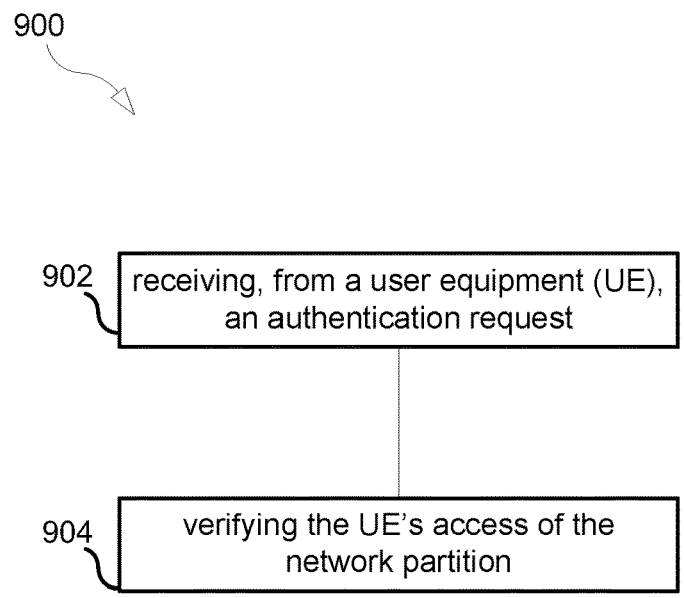

FIG. 9 illustrates a method 900, implemented in a network partition. The method includes receiving, from a user equipment (UE), an authentication request (step 902). In some embodiments, the authentication request includes a network partition information. In some embodiments, the method further includes selecting a Packet Data Network (PDN) Gateway (PGW) based on the network partition information.

The method further includes verifying the UE's access of the network partition (step 904). In some embodiments, the verifying is based on UE subscription data.

Figure 10:
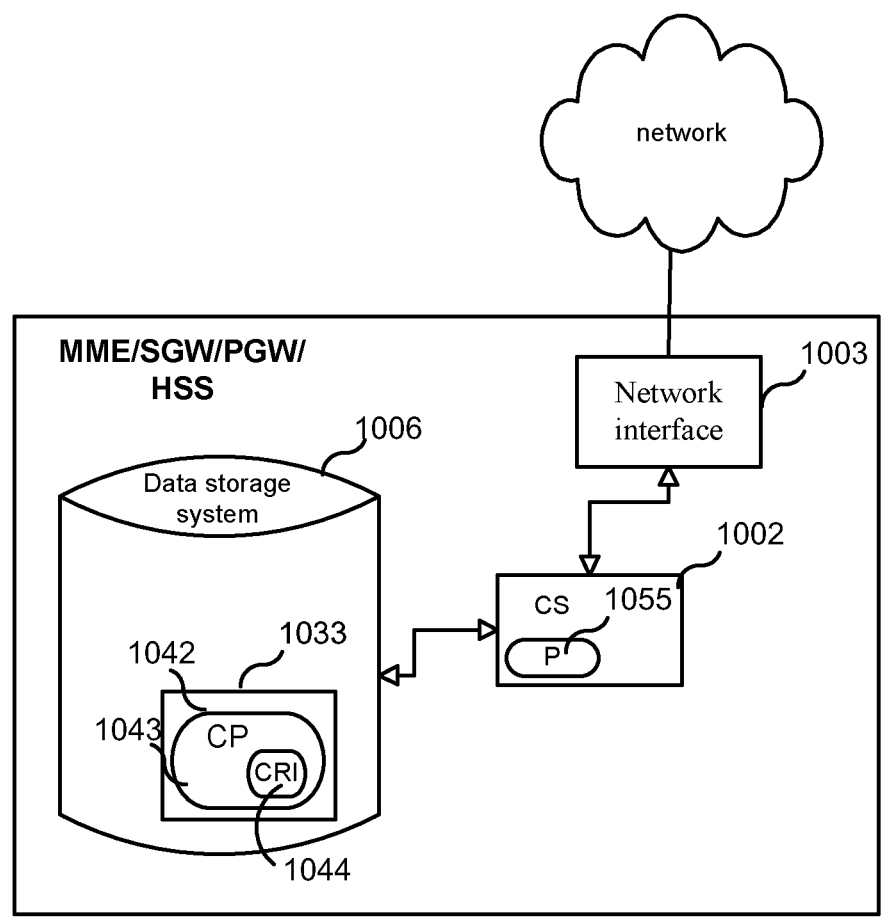
FIG. 10 illustrates an exemplary control node.

FIG. 10 is a block diagram of an embodiment of an exemplary control node. As shown in FIG. 10, the control node may include or consist of: a computer system (CS) 1002, which may include one or more processors 1055 (e.g., a general purpose microprocessor) and/or one or more circuits, such as an application specific integrated circuit (ASIC), field-programmable gate arrays (FPGAs), a logic circuit, and the like; a network interface 1003 for use in connecting the control node to a network; and a data storage system 1006, which may include one or more non-volatile storage devices and/or one or more volatile storage devices (e.g., random access memory (RAM)). In embodiments where the control node includes a processor 1055, a computer program product (CPP) 1033 may be provided. CPP 1033 includes or is a computer readable medium (CRM) 1042 storing a computer program (CP) 1043 comprising computer readable instructions (CRI) 1044. CRM 1042 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 1044 of computer program 1043 is configured such that when executed by computer system 1002, the CRI causes the control node to perform steps described above (e.g., steps described above with reference to the flow charts and message flows shown in the drawings). In other embodiments, the control node may be configured to perform steps described herein without the need for a computer program. That is, for example, computer system 1002 may consist merely of one or more ASICs. Hence, the features of the embodiments described herein may be implemented in hardware and/or software.

Figure 11:
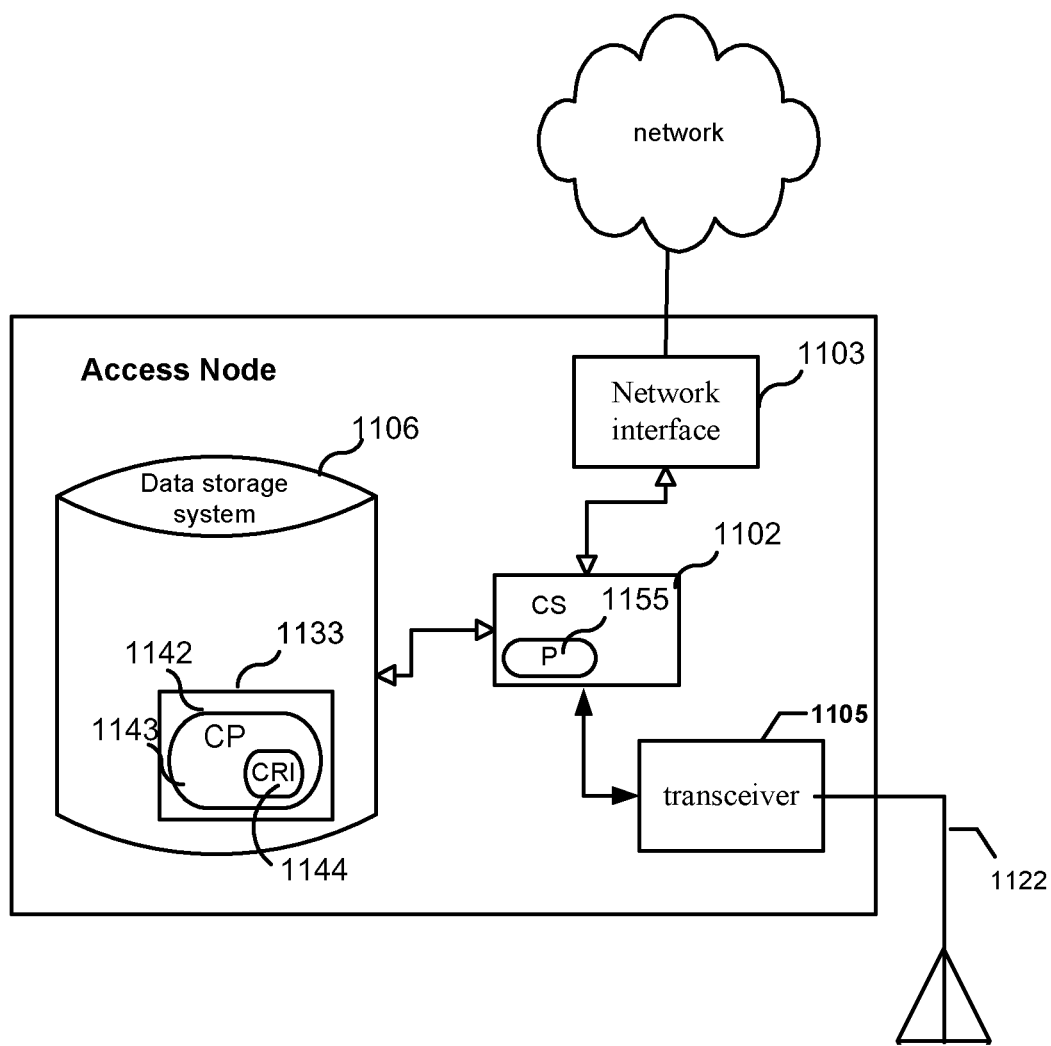
FIG. 11 illustrates an exemplary access device.

FIG. 11 illustrates a block diagram of an exemplary access node, such as node 404 shown in FIG. 4. As shown in FIG. 11, the access node 404 may include: a data processing system 1102, which may include one or more microprocessors and/or one or more circuits, such as an application specific integrated circuit (ASIC), field-programmable gate arrays (FPGAs), and the like; a network interface 1110; a transceiver 1104, and a data storage system 1106, which may include one or more non-volatile storage devices and/or one or more volatile storage devices (e.g., random access memory (RAM)). According to some embodiments, the data processing system 1102 may comprise a control unit used for selection of transmission parameters.

In embodiments where data processing system 1102 includes a microprocessor, computer readable program code (CRPC) 1108 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1102 to perform steps described above (e.g., steps described above with reference to the flow charts and message flows shown in the drawings). In other embodiments, the access node 1104 is configured to perform steps described herein without the need for code. That is, for example, data processing system 1102 may consist merely of one or more ASICs. Hence, the features of the embodiments described herein may be implemented in hardware and/or software. For example, in particular embodiments, the functional components of the base station described above may be implemented by data processing system 1102 executing computer instructions, by data processing system 1102 operating independent of any computer instructions, or by any suitable combination of hardware and/or software.

Figure 12:
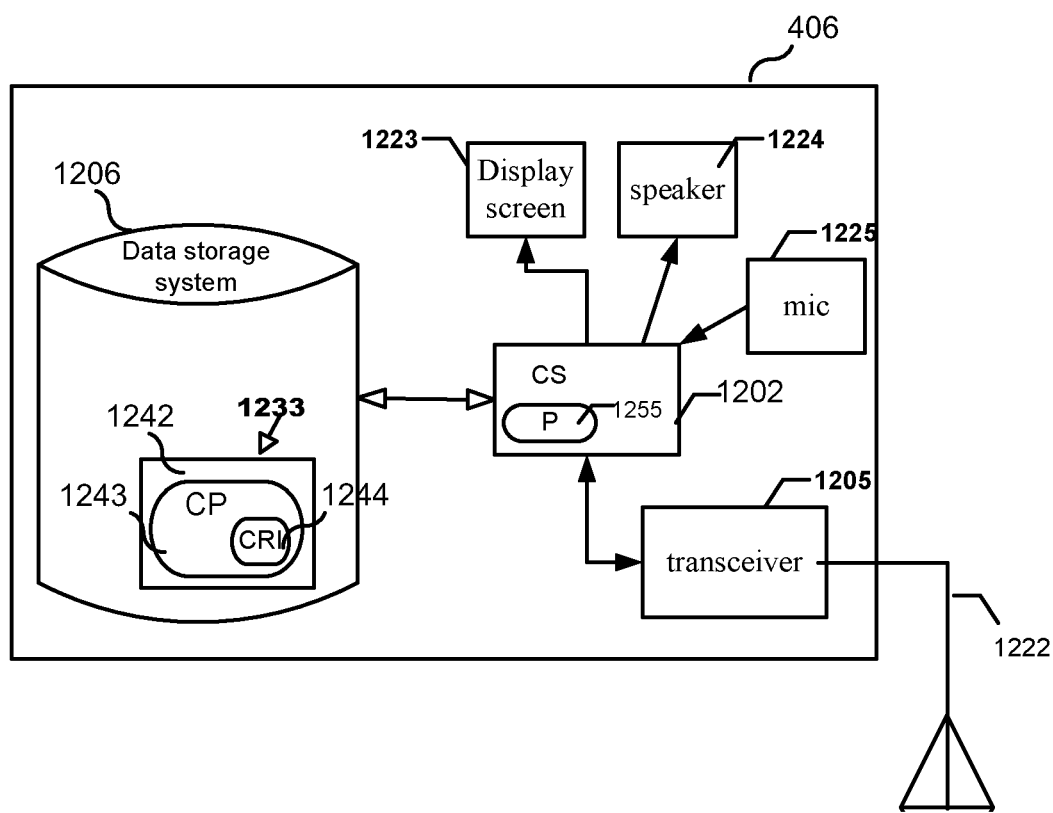
FIG. 12 illustrates and exemplary wireless device.

FIG. 12 is a block diagram of a UE according to some embodiments. As shown in FIG. 12, the UE may include or consist of: a computer system (CS) 1202, which may include one or more processors 1255 (e.g., a general purpose microprocessor) and/or one or more circuits, such as an application specific integrated circuit (ASIC), field-programmable gate arrays (FPGAs), a logic circuit, and the like; a transceiver 1205, coupled to an antenna, 1222 for transmitting and receiving data wireless; and a data storage system 1206, which may include one or more non-volatile storage devices and/or one or more volatile storage devices (e.g., random access memory (RAM)). In embodiments where the UE includes a processor 1255, a computer program product (CPP) 1233 may be provided. CPP 1233 includes or is a computer readable medium (CRM) 1242 storing a computer program (CP) 1243 comprising computer readable instructions (CRI) 1244. CRM 1242 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 1244 of computer program 1243 is configured such that when executed by computer system 1202, the CRI causes the UE to perform steps described above (e.g., steps described above with reference to the flow charts and message flows shown in the drawings). In other embodiments, the UE may be configured to perform steps described herein without the need for a computer program. That is, for example, computer system 1202 may consist merely of one or more ASICs. Hence, the features of the embodiments described herein may be implemented in hardware and/or software. As shown in FIG. 12, the UE may include: a display screen 1233, a speaker 1224, and a microphone ("mic") 1225, all of which are coupled to CS 1202.

Although terminology from 3GPP HSPA has been used in this disclosure to exemplify the exemplary embodiments, one of ordinary skill in the art would understand this as not limiting the scope of the present embodiments to only the aforementioned system. Other wireless systems, including LTE, LTE-A, WiMax, UMB and GSM, may also benefit from exploiting the ideas covered within this disclosure.

Furthermore, the terminology such as NodeB and UE are non-limiting and does in particular do not imply a certain hierarchical relation between the two; in general "NodeB" could be considered as device 1 and "UE" device 2, and these two devices communicate with each other over some radio channel.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

ABBREVIATIONS

3GPP 3rd Generation Partnership Project
AAA Authentication, Authorization, Accounting Server
DÈCOR Dedicated Core Networks
DNS Domain Name System
eNB E-UTRAN Node B
ePDG evolved Packet Data Gateway
EPC Evolved Packet Core
EPS Evolved Packet System
E-UTRAN Evolved Universal Terrestrial Radio Access Network
FQDN Fully Qualified Domain Name
GERA GSM/EDGE Radio Access
HSS Home Subscriber Server
LTE Long Term Evolution
MBB Mobile Broadband
MAC Medium Access Control
MCC Mobile Country Code
MME Mobility Management Entity
MNC Mobile Network Code
MTC Machine Type Communication
OSS Operation Support Systems
PCRF Policy and Charging Rules Function
PGW PDN Gateway
PDCP Packet Data Convergence Protocol
PDN Packet Data Network
PLMN Public Land Mobile Network
RAN Radio Access Network
RLC Radio Link Control
RNC Radio Network Controller
RRC Radio Resource Control
SGSN Serving GPRS Support Node
SGW Serving Gateway
TWAG Trusted WLAN Gateway
UTRA Universal Terrestrial Radio Access
VoLTE Voice over LTE
WLAN Wireless Local Area Network

The invention claimed is:

1. A method implemented in a user equipment (UE), the method comprising:
the UE connecting to a wireless local area network (WLAN) access point;
the UE constructing a domain name for a packet system network, the domain name comprising: i) a Public Land Mobile Network (PLMN) identifier for identifying a PLMN and ii) a network partition identifier, separate from the PLMN identifier, for identifying a network partition within the identified PLMN, wherein the PLMN identifier comprises a Mobile Country Code (MCC) value and a Mobile Network Code (MNC) value;
the UE transmitting, to a server via the WLAN access point, the constructed domain name; and
the UE receiving, from the server, at least one address corresponding to a network node associated with the network partition identifier.

2. The method of claim 1, wherein the packet system network includes an Evolved Packet System (EPS) and the WLAN access point is associated with an untrusted non-3GPP access.

3. The method of claim 1, wherein the identified network partition includes one or more network nodes or functions.

4. The method of claim 1, wherein the partition identifier includes at least one of device type and use-case type.

5. The method of claim 1, wherein the network partition identifier is pre-configured in the UE.

6. The method of claim 1, further comprising:
the UE receiving, from the packet system network, the network partition identifier in an over-the-air message.

7. The method of claim 1, wherein the constructed domain name is a fully qualified domain name (FQDN), and wherein the at least one address is an IP address to an evolved Packet Data Gateway (ePDG).

8. The method of claim 7, further comprising:
the UE sending an authentication request to the ePDG; and
the UE setting up an IP Security (IPsec) tunnel with the ePDG.

9. The method of claim 8, wherein the authentication request sent by the UE comprises the network partition identifier.

10. The method of claim 1, wherein the server is a domain name server (DNS).

11. A method implemented in a network partition, the method comprising:

receiving, from a user equipment (UE), an authentication request; and in response to the authentication request, verifying the UE's access of the network partition, wherein the authentication request includes a network partition identifier identifying a network partition within a Public Land Mobile Network (PLMN), and the method further comprises selecting a Packet Data Network (PDN) Gateway (PGW) based on the network partition identifier included in the authentication request.

12. The method of claim 11, wherein the verifying is based on UE subscription data.

13. A user equipment (UE), comprising:
a processor; and
a non-transitory computer readable medium coupled to the processor, said non-transitory computer readable medium containing instructions executable by the processor, whereby the UE is operative to:
connect to a WLAN access point;
construct a domain name for a packet system network, the domain name comprising: i) a Public Land Mobile Network (PLMN) identifier for identifying a PLMN and ii) a network partition identifier, separate from the PLMN identifier, for identifying a network partition within the identified PLMN, wherein the PLMN identifier comprises a Mobile Country Code (MCC) value and a Mobile Network Code (MNC) value;
transmit, to a server via the WLAN access point, the constructed domain name; and
receive, from the server, at least one address corresponding to a network node associated with the network partition identifier.

14. The UE of claim 13, wherein the packet system network includes an Evolved Packet System (EPS) and the WLAN access point is associated with an untrusted non-3GPP access.

15. The UE of claim 13, wherein the identified network partition includes one or more network nodes or functions.

16. The UE of claim 13, wherein the network partition identifier includes at least one of device type and use-case type.

17. The UE of claim 13, wherein the network partition identifier is pre-configured in the UE.

18. The UE of claim 13, further comprising:
receiving, from the packet system network, the network partition identifier in an over-the-air message.

19. The UE of claim 13, wherein the constructed domain name is a fully qualified domain name (FQDN), and wherein the at least one address is an IP address to an evolved Packet Data Gateway (ePDG).

20. The UE of claim 19, wherein the UE is further operative to:
send an authentication request to the ePDG; and
set up an IP Security (IPsec) tunnel with the ePDG.

21. The UE of claim 20, wherein the authentication request comprises the network partition identifier.

22. The UE of claim 13, wherein the server is a domain name server (DNS).

23. A node in a network partition, comprising:
one or more processors; and
a non-transitory computer readable medium coupled to the one or more processors, said non-transitory computer readable medium containing instructions executable by the one or more processors, whereby the node is operative to:
receive, from a user equipment (UE), an authentication request; and
in response to the authentication request, verify the UE's access of the network partition, wherein
the authentication request includes a network partition identifier identifying a network partition within a Public Land Mobile Network (PLMN), and
the method further comprises selecting a Packet Data Network (PDN) Gateway (PGW) based on the network partition identifier included in the authentication request.

* * * * *